July 31, 1956     P. E. HAGGERTY     2,757,356
METHOD AND APPARATUS FOR CANCELING
REVERBERATIONS IN WATER LAYERS Filed Jan. 8, 1954     2 Sheets-Sheet 1

INVENTOR.
PATRICK E. HAGGERTY
BY
Stevens, Davis, Miller & Mosher
ATTORNEYS

July 31, 1956

P. E. HAGGERTY 2,757,356

METHOD AND APPARATUS FOR CANCELING
REVERBERATIONS IN WATER LAYERS

Filed Jan. 8, 1954

INVENTOR.
PATRICK E. HAGGERTY
BY
Stevens, Davis, Miller & Mosher
ATTORNEYS

2,757,356
METHOD AND APPARATUS FOR CANCELING REVERBERATIONS IN WATER LAYERS

Patrick E. Haggerty, Dallas, Tex., assignor to Texas Instruments Incorporated, Dallas, Tex., a corporation of Delaware Application January 8, 1954, Serial No. 402,987

28 Claims. (Cl. 340—7)

This invention relates to a method for seismic prospecting over water covered areas and more particularly to improving the results obtained as a result of such seismic reflection work over water covered areas by providing for the cancellation of reverberations which otherwise would tend to confuse, obscure, or jeopardize the indentification of desired reflections from underlying strata. This invention also relates to an apparatus for accomplishing this end. The areas with which this invention has specific reference are those where the water bottom is smooth, level, and composed of material with a high coefficient of reflection, thereby providing in combination with the air-water surface a good reflector at both boundaries of the water layer.

While surveying over water in certain areas, seismic records which at first appeared to be good reflection records were in reality discovered to be made up of sound reverberations in the water and near-surface layers. The occurrence of this phenomenon was noticed regardless of whether the reverberations were generated by the detonation of an explosive placed generally within the water layer, above the water surface, or in holes drilled in the water bottom. These sound reverberations in the water or standing waves had the effect of either jeopardizing the identification of desired reflections or totally obscuring them. The chief characteristic of records subject to the standing wave reverberation phenomenon was periodicity or a state of near-periodicity with often an almost exactly detailed repetition of trace movement period after period.

An investigation of the physical formation of the seismic prospects where this phenomenon occurred showed that two characteristics were present. In each instance the bottom of the body of water was composed of material with a high coefficient of reflection or else the apparent seismic bottom of the water was underlain by a succession of thin, hard, high-velocity layers; and further the bottom was smooth and level as distinguished from being rugged or having any appreciable slope in which circumstances standing waves would not be generated. Due to the large velocity contrast between the air and water layers, the water surface provided a natural reflector. From the knowledge of these factors, a theory was developed which made it possible to accurately predict certain of the characteristics of these reverberations such as frequency, phase, and group velocity. A statement of this theory is that a water layer bounded by a smooth, generally level layer of material with a high coefficient of reflection forms an effective wave guide for seismic energy propagation.

Further understanding of the theory set forth above and an appreciation of the development of the present invention will be readily gained from the ensuing discussion. In this regard frequent reference is invited to the first four figures of the drawings attached hereto and made a part hereof as the explanation progresses.

Figure 1:
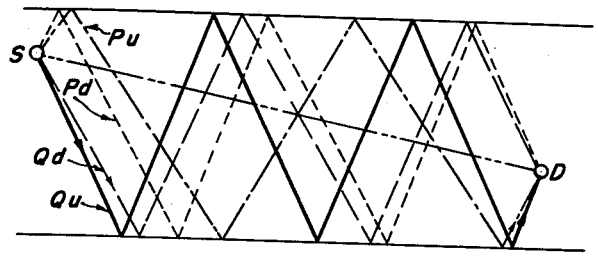
Figure 1 is a diagrammatic representation showing the characteristic types of wave paths produced within a water layer when a shot is detonated over a seismic prospect of the type under consideration.
Figure 2:
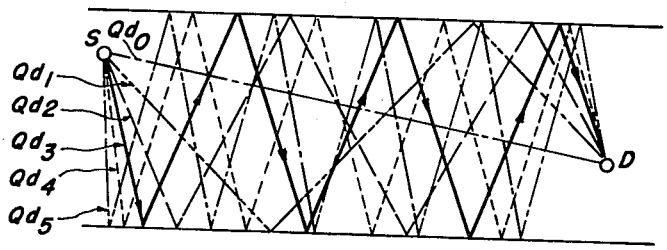
Figure 2 is a diagrammatic representation showing a series of reflection paths taken by waves common to one of the four characteristic types shown in Figure 1, the one chosen for illustration being the type of path which is generated initially downwardly and passes the detector in a downward direction.

Referring now to Figure 1, it will be observed that four different types of wave paths are shown between the source S and the detector D. Two of the four wave paths, $P_u$ and $P_d$, are generated initially upwardly, but after multiple reflections off the water surface and the water bottom, the $P_d$ path passes the detector in a downward direction while the $P_u$ path passes the detector in an upward direction. This is due to the fact that the $P_d$ path has reflected through a longer path than the $P_u$ wave because of the initially smaller angle of incidence. Similarly, the other two paths, $Q_u$ and $Q_d$, are reflected initially downwardly, but upon arrival at the detector, the $Q_u$ path passes the detector in an upward direction while the $Q_d$ path passes the detector in a downward direction because of the initially different angles of incidence as in the $P_u$ and $P_d$ paths. Further, since an infinite number of waves are generated with each explosion, there will be a large number of waves generated which follow each one of the characteristic wave paths. This is illustrated in Figure 2 by the $Q_d$ path in which the waves $Q_{d1-5}$ with successively smaller angles of incidence are generated initially downwardly and after multiple reflections between the water surface and the water bottom, pass the detector in a downward direction. It follows from this that each detector is subjected to repeated bursts of energy reflected from both the water surface and from the water bottom.

A standing wave may be regarded as a stationary interference pattern produced when two traveling wave trains of the same wave length traveling in opposite directions interfere. The interference is destructive at the nodes where there is no motion and constructive at the antinodes where the amplitude is equal to the sum of the amplitudes of the component waves. Thus, the nodes are points of equilibrium and represent points of zero particle movement, but the antinodes, located at points midway between the nodes, are points at which the amplitude of vibration is at a maximum. As the explosive charge is detonated, a sharp pulse or a train of waves is generated which spreads out spherically and is multiply-reflected back and forth within the water layer as indicated in Figures 1 and 2. It is apparent that if the waves produced by the explosion are of the same wave length and are deflected in vertical paths but in opposite directions, the condition produced in the water layer would coincide exactly with conventional standing wave theory. This, however, is not the exact situation since the wave paths generated are not only vertical but also have an angle of incidence. Hence, the waves advance a distance equal to the horizontal component of the velocity of the reflecting wave. Because as one wave advances another wave behind has also advanced to take the position of the preceding wave, the effect of two traveling wave trains of the same wave length traveling in opposite directions continues with the consequent constructive and destructive interference of standing waves.

Figure 3:
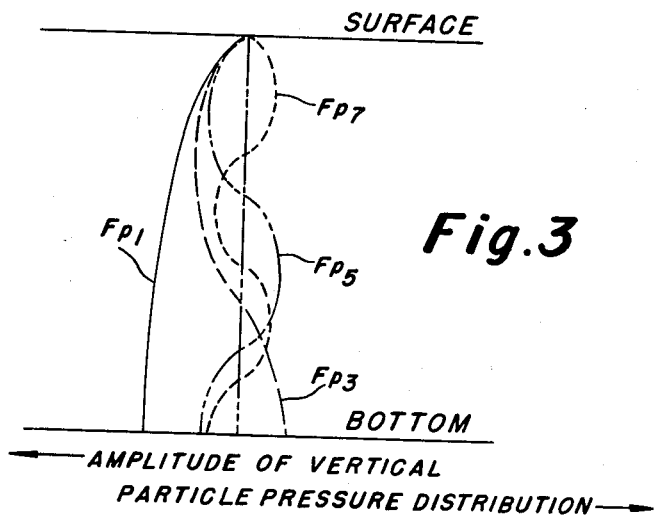
Figure 3 is a plot of the vertical particle pressure distribution for the fundamental frequency and a number of odd harmonic frequencies of standing waves versus depth in the water layer.
Figure 4:
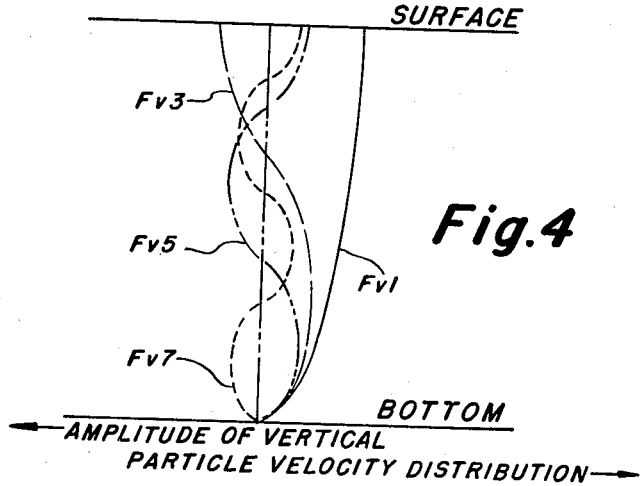
Figure 4 is a plot of the vertical component of particle velocity for the fundamental frequency and a number of odd harmonic frequencies of standing waves versus depth in the water layer.

With the effect of standing waves thus created, the vertical distribution of pressure and vertical component of particle velocity of the standing wave can be found from formulas applicable to standing wave theory. The formulas for the vertical distribution of pressure and vertical component of particle velocity, respectively, are as follows:

$$\sin\left[\frac{(2n-1)\pi Z}{2H}\right] \quad \cos\left[\frac{(2n-1)\pi Z}{2H}\right]$$

where
$H$ = the depth of the water layer
$Z$ = the depth in the water layer to the node or antinode for a wave of a given frequency
$n = 1, 2, 3 \ldots$, a series of integers representing the fundamental frequency of the wave and harmonic frequencies of the fundamental frequency Plotting graphs with the aid of the foregoing formulas, the result is as shown in Figures 3 and 4. Figure 3 represents the amplitude of the vertical distribution of pressure for the fundamental standing wave frequency $f_{p1}$ and the third, fifth, and seventh harmonic frequencies designated respectively as $f_{p3}$, $f_{p5}$, and $f_{p7}$. Similarly, Figure 4 represents the amplitude of the vertical component of particle velocity of the fundamental standing wave frequency $f_{v1}$ and the third, fifth, and seventh harmonic frequencies designated respectively as $f_{v3}$, $f_{v5}$, and $f_{v7}$. An examination of Figures 3 and 4 reveals that for pressure distribution, a node exists at the surface of the waterlayer and an antinode exists at the water bottom for all frequencies while the reverse is true in the case of vertical component of particle velocity in that the nodes exist at the water bottom and the antinodes exist at the water surface for all frequencies.

Further, from these graphs of wave amplitude distribution in the water layer, a tabulation can be prepared showing the depths of the nodes and antinodes below the surface of the water for both pressure distribution and vertical particle velocity as follows:

| Harmonic | Nodes for Vertical Particle Velocity | Nodes for Vertical Distributions of Pressure |
|---|---|---|
| First | Z=H | Z=0 |
| Third | Z=H/3, H | Z=0, 2H/3 |
| Fifth | Z=H/5, 3H/5, H | Z=0, 2H/5, 4H/5 |
| Seventh | Z=H/7, 3H/7, 5H/7, H | Z=0, 2H/7, 4H/7, 6H/7 |

| Harmonic | Antinodes for Vertical Particle Velocity | Antinodes for Vertical Distributions of Pressure |
|---|---|---|
| First | Z=0 | Z=H |
| Third | Z=0, 2H/3 | Z=H/3, H |
| Fifth | Z=0, 2H/5, 4H/5 | Z=H/5, 3H/5, H |
| Seventh | Z=0, 2H/7, 4H/7, 6H/7 | Z=H/7, 3H/7, 5H/7, H |

Theoretically, the most effective position for a detector would be at a nodal plane because at this point the particles in a standing wave have no particle velocity or pressure. An examination of Figure 3 and the tabulation for pressure nodes shows that the water surface is a node for the fundamental and all harmonic frequencies of standing waves. However, the characteristic of the water surface which makes the vertical distribution of pressure for standing waves a node at the surface also makes the surface a node for all variations in pressure due to other reflected waves. Since a pressure sensitive seismometer is required to sense variations in pressure, it follows that a pressure sensitive seismometer located at the surface would receive neither desirable nor undesirable waves. In like manner, the only nodal plane common to all the fundamental and all harmonics of the fundamental frequency for vertical particle velocity is the bottom of the water layer as shown in the tabulation and Figure 4. In actual practice, it is difficult to locate a seismometer upon the bottom and even so, the apparent bottom may not be the effective seismic bottom.

In addition, for harmonic frequencies other than the fundamental frequencies, there are nodal planes located within the water layer at various depths. The depth of these nodal planes varies as the depth of the water increases and because a continuous record is not always made of the depth, it may not be possible to locate and maintain the seismometer spread at the nodal plane depth. It can be seen from a consideration of the above formulas that it is very important for the spread to be very close to the nodal plane depth because of the rapid rise in amplitude per unit phase angle. Thus, as the phase angle shifts through 30 degrees on either side of the nodal plane, the amplitude of the vibration rises and falls between zero and 50% of the maximum amplitude.

A consideration of the theoretical and practical difficulties of locating a seismometer spread at a nodal plane to avoid the reverberations of standing waves revealed the necessity of developing a method that would overcome these difficulties. Accordingly, the present invention was developed for this purpose, namely, to overcome the difficulties of locating a seismometer spread at a nodal plane. This is accomplished by the present invention by providing a method that makes use of two spreads located at the antinodes of the standing waves. Variations in depth of the spreads at the precise location of the antinodes will, in this arrangement, not be nearly so critical as when they are located at the nodes. Measured by the same criterion as for location at the nodal plane, namely, rate of change in amplitude per unit phase angle, variation in depth from the antinodes produces changes in amplitude to a much lesser extent. For example, when using the antinodes of either pressure or velocity distribution as the location of the seismometer spread, the spread can vary in depth to a distance equivalent to a phase angle of 25 degrees for the particular frequency on either side of the antinode and still be subject to vibrations at 90% of the maximum amplitude.

The tabulation given above for the location of the antinodes of pressure and velocity distribution shows that seismometer spreads can be located at a number of different positions including the water surface and water bottom. By choosing locations so that the vibrations received at one location are 180 degrees out of phase from the vibrations received at the other location, the outputs from the two spreads can be composited and the out-of-phase vibrations canceled by the recording equipment. It should be recognized that all the harmonic frequencies of a given fundamental frequency exist at the same time within the water layer and that the antinode for one harmonic may lie very close to the antinode of a different harmonic frequency. The effects of different harmonics, however, can be practically eliminated by a proper design of the bandpass characteristics of the amplifier equipment. Thus, if the amplifier has a maximum response to frequencies within a certain range, reverberation frequencies out of the bandpass range though received at one detector will not be recorded or interfere with the cancellation of the reverberations received at the second detector.

In accordance with the reasons and theory given in preceding paragraphs, it will now be apparent that a prime object of this invention to provide a method and apparatus for canceling reverberations within the water layer by the use of two spreads of seismometers so spaced from each other as to receive a given standing wave 180° out of phase. By receiving and adding the outputs from similar seismometer locations on the two spreads at the recording point prior to recording, the out-of-phase reverberations will cancel each other leaving the desired reflections from underground strata.

It is a further object of this invention to provide a method and apparatus for canceling reverberations wherein the spreads are positioned at depths in the water corresponding to antinodes of vertical particle pressure or velocity distribution as determined by the harmonic frequencies of the standing wave developed in the layer.

It is another object of this invention to provide a method and apparatus for canceling reverberations wherein the spreads are positioned so that one spread may be substantially at the surface of the water layer while the other spread is located within the water layer or substantially at the bottom of the layer and wherein suitable detecting equipment is provided for use with each spread in accordance with its location at an antinode for pressure or velocity.

It is a still further object of the present invention to provide a method to overcome the difficulties of the prior art as above enumerated and thereby more efficiently carry out seismic reflection work than methods heretofore known.

Other and further objects will become apparent from the following description. To gain a complete understanding of the invention, it is suggested that frequent reference be made to the remaining figures of the drawings as the description proceeds.

Figure 5:
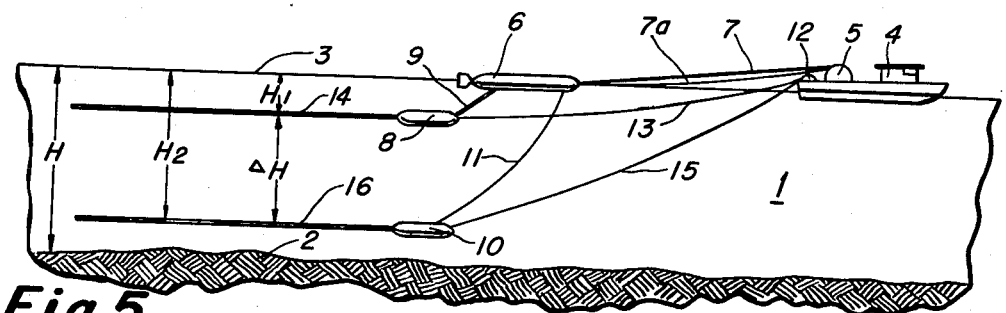
Figure 6:
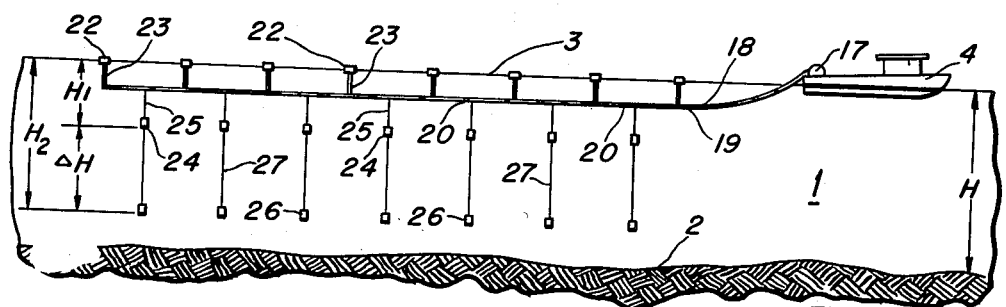
Figure 7:
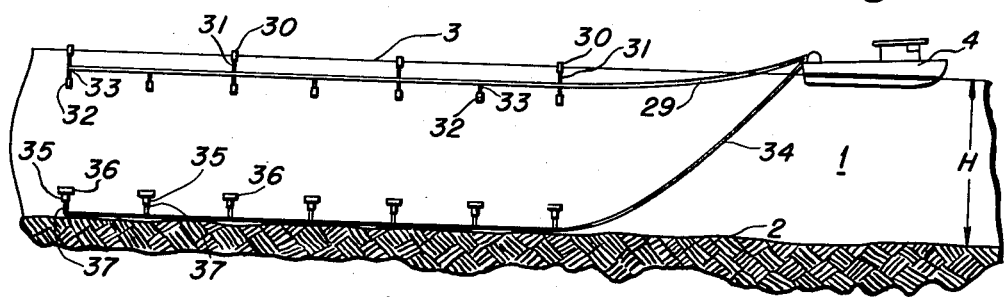

In the drawings:

Figure 5 is a diagrammatic section through a body of water showing a method for obtaining seismic records from a continuously moving ship over a prospect which is subject to producing reverberations in the water layer;

Figure 6 is a diagrammatic section like Figure 5 showing apparatus suitable for positioning two series of seismometers within the water layer at different depths; and Figure 7 is a diagrammatic section like Figure 5 showing apparatus positioning one spread at the surface of the water layer and a second spread at the bottom of the water layer.

Referring now to the remaining figures of the drawings, in Figure 5 an equipment is shown suitable for positioning two spreads at depths corresponding to the antinodes of the third harmonic and other higher harmonic frequencies as well, the equipment being arranged for continuous operation. The water layer, designated generally by the numeral 1, is bounded by the water bottom 2 and the air-water surface 3. A ship 4 is used to tow the equipment through the water and for this purpose is provided with a reel 5 mounted at its stern. Steel cable 7, wound on the reel 5, is attached to a comparatively long cylindrical "fish" 6 which is towed behind ship 4 at any required distance. Mounted within and at either end of "fish" 6 are two reversible, direct current motors (not shown) connected with and controlled from ship 4 by means of suitable conductors in a cable 7a. The two direct current motors in turn control the length of two steel lines 9 and 11 extending downwardly from "fish" 6. The purpose in locating lines 9 and 11 at a distance from each other is to avoid the tendency for the lines to become entangled. Weights 8 and 10 are attached to the lower ends of lines 9 and 11, respectively.

Streamer 14, complete with pressure sensitive seismometers arranged with their output leads in a single flexible cable, is towed behind weight 8. A similar streamer 16 is towed behind weight 10. The output signals from the seismometers within the streamers 14 and 16 are carried to the ship by means of conductor cables 13 and 15 connected with streamers 14 and 16, respectively. The conductor cables 13 and 15 and streamers 14 and 16 are hauled abroad ship with the assistance of a winch 12 when necessary or desired. The streamers are constructed with a specific gravity very nearly that of the water medium and consequently, require no additional supports to maintain the depths set by the weights 8 and 10.

When the depth H of the water layer 1 is known, the rear direct current motor of "fish" 6 can be operated to lower weight 8 to a depth $H_1$ and the forward motor operated to lower weight 10 to a depth $H_2$, thus, positioning streamers 14 and 16 at the antinodes for the desired harmonic frequencies. The streamers will then be separated by a distance of $\Delta H$. If it is desired to position the weights 8 and 10 in the layer precisely, direct reading pressure sensing elements can be installed in the weights 8 and 10 and the indicating instruments located on board ship 4. Further, more fully automatic operation can be obtained by the use of a continuously reading "Fathometer" to measure variations in water layer depth. By means of the "Fathometer," pressure sensitive depth indicators, and the reversible electric motors in "fish" 6, the streamers can be maintained very accurately at the antinodes of standing wave pressure distribution for any harmonic frequency of the wave.

Although Figure 5 is described in terms of pressure type seismometers mounted within streamers 14 and 16, it is possible to construct velocity type seismometer streamers by using gimbal mounts for the seismometers and still maintain a practically constant diameter streamer with a specific gravity very nearly that of the water medium. With such streamers, the operation of the apparatus would be the same as described in Figure 5 except that streamer 14 can also be positioned at the velocity antinode for the fundamental frequency of the standing wave. Thus, the depth $H_1$ of streamer 14 would practically coincide with the water surface and the direct current motor of "fish" 6 would not be operated to lower weight 8.

In Figure 6, the apparatus shown is also suitable for positioning the spreads at the antinodes of either pressure or velocity distribution. The apparatus of Figure 6 differs from the apparatus of Figure 5 in that the depth of the respective spreads is fixed before being placed in the water and remains constant throughout the recording process but is similar in that either pressure or velocity type seismometers may be used. A cable, consisting of a steel tension member 18 and a conductor cable 19 bound together by bands 20 is supported in the water by means of a series of floats 22 spaced along the length of the cable and attached to the cable by leads 23. The length of cable in the water is controlled by cable mounting reel 17 located at the stern of ship 4. The seismometer spread at a depth $H_1$ consists of a series of seismometers 24 supported from the cable assembly by leads 25 of the necessary length. The seismometers 26 located at a depth $H_2$ are supported by leads 27 from seismometers 24 with a length $\Delta H$ to position the lower seismometer spread at the out-of-phase antinode for the expected harmonic frequency. As stated previously, the depth $H_1$ and depth $H_2$ are predetermined in accordance with the depth H of the water layer for each particular seismic prospect. It should be noted that the apparatus shown is representative only since any number of different arrangements can be devised to accomplish the same results.

Figure 7 shows apparatus whereby one spread is positioned very close to the water surface while the other is positioned in close proximity with the bottom of the layer. This particular arrangement takes advantage of the fact that at the fundamental frequency for the particular water depth, an antinode for the vertical velocity component exists at the surface while at the bottom, an antinode exists for the vertical distribution of pressure. If it is desired to cancel reverberations in the water layer by means of this apparatus, velocity type seismometers are used for the spread positioned at the surface of the water layer while pressure type seismometers are used in connection with the spread at the water bottom. The construction and differences between pressure type and velocity type seismometers is well known in the art of seismic surveying and need not be discussed with reference to this invention.

The length of spreads 29 and 34 are controlled by means of a two-section reel 28 located on ship 4 which allows each spread to be controlled individually. The cable at the water surface, cable 29, is supported by a series of floats 30 and appropriate short length leads 31 connecting the floats 30 and cable 29. The velocity type seismometers 32 are in turn connected to cable 29 by means of appropriately short length leads 33. Cable 34 extends to the bottom of the water layer and is constructed with an apparent specific gravity greater than 1 so that it will remain on the ocean bottom. The pressure type seismometers 35 are maintained in a position vertically above the cable by means of floats 36 and are attached to cable 34 by leads 37. The position of the respective seismometer spreads is such that the seismometers, although not located precisely at the antinode, will still receive reverberations of the order of 90% or more of maximum amplitude.

Although the present invention has been disclosed with regard to specific embodiments of the apparatus and particular steps of the method, nevertheless, various departures in the apparatus or method which are readily apparent to one skilled in the art are felt to be within the teachings of this invention.

What is claimed is:

1. Apparatus for use in seismic surveying over water covered areas comprising a cable, means adapted to support said cable substantially at the water surface, a first series seismometers attached to said cable by appropriate length leads, a second series of seismometers attached to said first series of seismometers by appropriate length leads, said apparatus constituting two seismometer spreads adapted to be moved through the water layer at two distinct depths so that reverberations in the nature of standing waves in the water layer are received at said first series of seismometers 180° out of phase from reverberations received at said second series of seismometers, and means for combining the outputs from said series of seismometers whereby said reverberations are cancelled.

2. Apparatus as defined in claim 1 wherein said seismometers are of the pressure type.

3. Apparatus as defined in claim 1 wherein said seismometers are of the velocity type.

4. Apparatus for use in seismic surveying over water covered areas comprising two cables, means adapted to maintain one of said cables substantially at the water surface, a first group of seismometers connected with said surface cable by appropriate length leads, said other cable being constructed with a specific gravity greater than unity whereby when in use it will remain in contact with the bottom of said water layer, a second group of seismometers attached to said second cable by appropriate length leads, floats attached to said second group seismometers to maintain the seismometers at a predetermined position above said other cable said two groups of seismometers being positioned at two distinct depths in said water layer so that reverberations in the nature of standing waves in the water layer are received at said first series of seismometers 180° out of phase from reverberations received at said second series of seismometers, and means for combining the outputs from said series of seismometers whereby said reverberations are cancelled.

5. Apparatus as defined in claim 4 wherein said seismometers are of the pressure type.

6. Apparatus as defined in claim 4 wherein said seismometers at the surface spread are velocity type seismometers and those at the bottom spread of the pressure type.

7. Apparatus as defined in claim 4 wherein said seismometers are of the velocity type.

8. A method of seismic surveying over a water covered area which includes the steps of releasing acoustical energy for generating seismic waves which are reflected back from strata underlying the water layer, detecting said reflected waves at at least two depths in said water layer, said depths being preselected so that reverberations in the nature of standing waves within the water layer are detected 180° out of phase, and generating signals responsive to the detection of said waves whereby combining of said generated signals results in the elimination from the combined signal of effects produced by said reverberations.

9. A method of seismic surveying over a water covered area to eliminate reverberations in the nature of standing waves within the water layer which tend to obscure, confuse and jeopardize identification of reflected waves which includes the steps of releasing acoustical energy for generating seismic waves which are reflected back from strata underlying the water layer, detecting said reflected waves at at least two depths in said water layer, said depths being preselected so that reverberations in the nature of standing waves within the water layer are detected 180° out of phase, and generating signals responsive to the detection of said waves whereby combining of said generated signals results in the elimination from the combined signal of effects produced by said reverberations.

10. A method of seismic surveying over a water covered area to eliminate reverberations in the nature of standing waves within the water layer which tend to obscure, confuse and jeopardize identification of reflected waves which includes the steps of releasing acoustical energy for generating seismic waves which are reflected back from strata underlying the water layer, detecting said reflected waves at at least two depths in said water layer, said depths being preselected so that reverberations in the nature of standing waves within the water layer are detected 180° out of phase, generating signals responsive to the detection of said waves, and combining said generated signals whereby effects produced by said reverberations are eliminated from the combined signal.

11. A method of seismic surveying over a water covered area which includes the steps of releasing acoustical energy for generating seismic waves which are reflected back from strata underlying the water layer, detecting said reflected waves at at least two depths in said water layer, said depths being preselected so that reverberations in the nature of standing waves within the water layer are detected 180° out of phase and reflected waves are detected in phase, generating signals responsive to the detection of said waves, and combining said generated signals whereby effects produced by said reverberations are eliminated from the combined signal.

12. A method of seismic surveying over a water covered area which includes the steps of releasing acoustical energy for generating seismic waves which are reflected back from strata underlying the water layer, detecting said reflected waves at at least two depths in said water layer, said depths being preselected so that reverberations in the nature of standing waves within the water layer are detected 180° out of phase and reflected waves are detected in phase, generating signals responsive to the detection of said waves, combining said generated signals whereby effects produced by said reverberations are eliminated from the combined signal, and recording the combined signal to form a seismic record.

13. A method as defined in claim 8 further characterized by the detection of said waves occurring at depths within the water layer corresponding to antinodes of vertical particle velocity distribution for the harmonic frequencies of the fundamental frequency of the standing wave to be eliminated.

14. A method as defined in claim 8 further characterized by the detection occurring at depths within the water layer corresponding to antinodes of vertical particle pressure distribution for the harmonic frequencies of the fundamental frequency of the standing wave to be eliminated.

15. A method as defined in claim 8 further characterized by the detection occurring at one depth in the water layer corresponding to a pressure antinode for the fundamental frequency of the standing wave to be eliminated and occurring at another depth within the water layer corresponding to a pressure antinode for a harmonic frequency of said fundamental frequency.

16. A method as defined in claim 8 further characterized by the detection occurring at one depth in the water layer corresponding to a velocity antinode for the fundamental frequency of the standing wave to be eliminated and occurring at another depth in the water layer corresponding to a velocity antinode for a harmonic frequency of said fundamental frequency.

17. A method as defined in claim 8 further characterized by the detection occurring at one depth in the water layer corresponding to a pressure antinode for the fundamental frequency of the standing wave to be eliminated and occurring at another depth in the water layer corresponding to a velocity antinode for said fundamental frequency.

18. A method as defined in claim 8 further characterized by the detection occurring at one depth in the water layer corresponding to a pressure antinode for a harmonic frequency of the standing wave to be eliminated and occurring at another depth corresponding to a velocity antinode for a harmonic frequency of said standing wave.

19. A method as defined in claim 8 further characterized by the detection occurring at depths in the water layer corresponding to antinodes 180° out of phase.

20. A method of seismic surveying over a water covered area to eliminate reverberations in the nature of standing waves within the water layer which tend to obscure, confuse and jeopardize identification of reflected waves which includes the steps of releasing acoustical energy for generating seismic waves which are reflected back from strata underlying the water layer, detecting said reflected waves at a plurality of points distributed at two depths in said water layer, said depths being preselected so that reverberations in the nature of standing waves within the water layer are detected 180° out of phase, generating signals responsive to the detection of said waves, and combining said generated signals whereby effects produced by said reverberations will be eliminated from the combined signals.

21. A method as defined in claim 20 which includes the further step of combining generated signals from corresponding points at the two depths whereby the reverberations will be cancelled whereas reflected waves from underlying strata will be added in amplitude.

22. Apparatus for use in seismic surveying over water covered areas comprising a comparatively long streamlined cylinder adapted to float on the water layer, two weights attached to said cylinder, means within said cylinder adapted to control the depth of said weights in the water layer, a streamer attached to each of said weights including seismometers and output leads from each seismometer, said two streamers adapted to be positioned at two distinct depths in said water layer so that reverberations in the nature of standing waves in the water layer are received at the seismometers of one streamer 180° out of phase from reverberations received at the seismometers of said other streamer, means for combining the outputs from the seismometers of both streamers whereby said reverberations are cancelled, said means being located at a remote point, conductor cables leading from said streamers to said means, and a recorder located at said remote point for recording the combined output from said means.

23. Apparatus as defined in claim 22 wherein the said streamers include pressure type seismometers.

24. Apparatus as defined in claim 22 wherein the said streamers include velocity type seismometers.

25. Apparatus as defined in claim 22 wherein the said streamers are constructed with a specific gravity substantially equal to that of the water layer.

26. Apparatus as defined in claim 1 wherein one series of seismometers are of the pressure type and the other series of seismometers are of the velocity type.

27. Apparatus as defined in claim 4 wherein one group of seismometers are of the pressure type and the other group of seismometers are of the velocity type.

28. Apparatus as defined in claim 22 wherein the seismometers of one streamer are of the pressure type and the seismometers of the other streamer are of the velocity type.

References Cited in the file of this patent

UNITED STATES PATENTS

| Number | Name | Date |
|---|---|---|
| 1,959,004 | Owen | May 15, 1934 |
| 2,465,696 | Paslay | Mar. 29, 1949 |
| 2,473,469 | Dahm | June 14, 1949 |
| 2,580,636 | Wolf | Jan. 1, 1952 |
| 2,610,240 | Pottorf | Sept. 9, 1952 |
| 2,654,874 | Press | Oct. 6, 1953 |
| 2,678,107 | Woods | May 11, 1954 |